United States Patent [19]

Armstrong

[11] 4,068,029

[45] Jan. 10, 1978

[54] MOLDED RESILIENT ELEMENT FOR VIBRATORY FEEDER

[75] Inventor: Jack W. Armstrong, Baldwinsville, N.Y.

[73] Assignee: Lipe Rollway Corporation, Syracuse, N.Y.

[21] Appl. No.: 756,395

[22] Filed: Jan. 3, 1977

Related U.S. Application Data

[63] Continuation-in-part of Ser. No. 671,559, March 29, 1976, abandoned.

[51] Int. Cl.² .................................................. B32B 3/06
[52] U.S. Cl. ........................................ 428/89; 428/92; 428/97; 198/446; 198/752
[58] Field of Search ...................... 428/85, 88, 89, 92, 428/95, 97; 198/30, 220 BA

[56] References Cited

U.S. PATENT DOCUMENTS

| | | | |
|---|---|---|---|
| 3,673,056 | 6/1972 | Nadler | 428/95 |
| 3,792,548 | 2/1974 | Hamano | 46/1 C |
| 3,821,064 | 6/1974 | Cima | 428/89 |
| 3,835,983 | 9/1974 | Horii | 198/220 BA |

Primary Examiner—William J. Van Balen
Attorney, Agent, or Firm—Stonebaker, Shepard & Stephens

[57] ABSTRACT

Resilient element material for a vibratory feeder is molded of a resilient plastic resin to have a base and generally upright elements molded integrally with the base and having upper ends that cooperate to support objects being fed vibrationally. The upright elements are configured so they bend in the feed direction and brace against bending in a direction opposite to the feed direction. This can be done by providing abutments or buttresses adjacent the elements, or configuring the elements so that the weight of the objects places a load on their upper ends spaced toward the direction of feed from respective lines perpendicular to the base through the centers of the bottoms of the elements. The upright elements then bend consistently in the feed direction under the weight of the objects during vibration to convey the objects along. The elements can also be molded to be tapered and to incline from a perpendicular to the base toward the direction of feed to bend reliably in the feed direction.

20 Claims, 16 Drawing Figures

MOLDED RESILIENT ELEMENT FOR VIBRATORY FEEDER

RELATED APPLICATIONS

This application is a continuation-in-part of my copending application Ser. No. 671,559, filed Mar. 29, 1976, entitled MOLDED BRISTLE PILE FOR VIBRATORY FEEDER, and abandoned upon filing of this continuation-in-part.

BACKGROUND OF THE INVENTION

Resilient element material for vibratory feeders is known to increase feeding speed and force and to have many other advantages such as quiet operation, no marring of parts, and some capacity to let solid or liquid particles run down between the elements while objects move along on the tips of the elements.

The previously preferred resilient element material for vibratory feeders was formed as a multitude of thin monofilaments of resin material set at an approximately uniform angle from the vertical in a base material. These bristle-like elements were about the thickness of natural hairbrush bristles and were formed in a fairly dense array so that the tips of the bristles could support small objects. The uniform incline of all the bristles established the direction of feed of objects and the direction of flexing of the bristles.

The previously preferred bristle pile material for vibratory feeders suffers from several disadvantages, and the invention involves recognition of these. They include high cost and quality-control problems, especially in accurately and uniformly setting the bristle inclination angle. Also, the base for such material includes a foamed resin that sometimes deteriorates in use. Moreover, in some environments, such as washing machines or conveying of parts from machines using coolants or producing metal chips, liquid and dirt particles can form a sludge that mats into the prior art bristles, reduces the conveyor effectiveness, and causes cleaning and maintenance problems.

The invention occurred during a search for a better resilient element material for a vibratory feeder, and the invention aims at low cost, light weight, durability, economical maintenance, high standards of quality control, and ease of manufacture and assembly.

SUMMARY OF THE INVENTION

The invention occurred while investigating a variety of possible substitutes for the previously preferred inclined bristle pile for vibratory feeders. It led to the surprising discovery that upright elements, as well as inclined elements, can work effectively in a vibratory feeder, providing the elements are structured or arranged in one of several possible ways that makes them bend in the direction of feed rather than in the opposite direction. Suitable upright or inclined resilient elements according to the invention can be injection molded or continuously molded at relatively low cost to produce an effective material that is lighter in weight, more durable, more chemical and solvent resistant, and more precisely controlled in quality than the best material available in the prior art.

More specifically, the inventive material is molded of resilient plastic resin to form a base with upright elements molded integrally with the base to extend upward from the base, and the upper ends of the elements cooperate to support objects being fed vibrationally. The elements are made to brace against bending in a direction opposite to the feed direction, and the elements are resilient enough to bend in the feed direction under the weight of the objects during vibration. This is done by properly configuring the elements themselves, or by abutments or buttresses adjacent the elements, and workable possibilities include tapered elements, elements having relatively thick lower regions and relatively thin upper regions, and tapered elements inclined from a perpendicular to the base toward the direction of feed.

DRAWINGS

FIGS. 3, 5, 7, 9, 11, 13, and 15 are enlarged, fragmentary side elevational views of other preferred embodiments of the inventive molded material; and FIGS. 4, 6, 8, 10, 12, 14, and 16 are enlarged, fragmentary plan views of the materials of FIGS. 3, 5, 7, 9, 11, 13, and 15, respectively.

DETAILED DESCRIPTION

It was previously believed by those skilled in the art of vibratory pile feeders that uniform inclination of pile bristles toward the direction of feed was essential to make the feeder work. Hence, it was a surprising discovery to find that upright elements can also be made to move objects swiftly and forcibly in a feed direction by bracing the elements so they are substantially more likely to bend in the feed direction rather than in the opposite direction when stressed. Once this was discovered, several ways were devised from making molded upright elements that bend only in the feed direction under the weight of objects being fed, and these are explained more fully below.

Molded resilient element material in any workable configuration also has several advantages over the prior art material having separately fabricated bristles secured in a matrix portion of a base. Molded elements are integral with a molded base and do not suffer from deterioration of the base support during use. Also, molded element material can be made much lighter than the prior art assembled material, and can be made from solvent- and chemical-resistant resins such as polyethylene or polypropylene to be unaffected by materials encountered in otherwise harsh environments. Also, the uniformity of the elements and the overall quality control of the molded product is much less difficult than for the prior art fabricated product. Furthermore, molded material has more open space between elements, making it less likely to mat or clog with dirt and easier to clean and maintain, so that molded material can be used in dirty environments where the prior art material was not successful.

As the advantages of molded material became appreciated and the operability of upright elements was discovered, a theoretical analysis of bending was made. Euler's formula for slender columns was used with assistance from S. Timoshenko, "Theory of Elastic Stability", McGraw-Hill 1936, and J. O. Smith and O. M. Sidebottom, "Elementary Mechanics of Deformable Bodies", MacMillan 1969. The theoretical study of resilient molded elements as slender columns showed that when a column is loaded at a point spaced from a vertical line through the center of the base of the column, the column always buckles toward the direction of the loading. In other words, the direction of bending of a molded element is from the vertical line through the base of the element toward the point where the load of the object is centered. This knowledge helped suggest ways for configuring elements so that they reliably bend in the feed direction and work well in a vibratory feeder.

Figure 1:
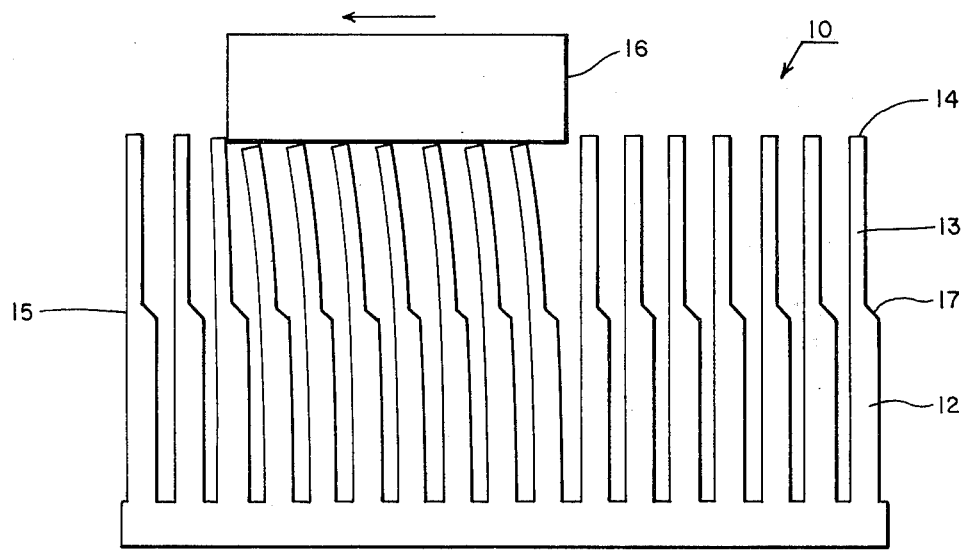
FIG. 1 is an enlarged side elevational view of a preferred form of a resilient element material made according to the invention.
Figure 2:
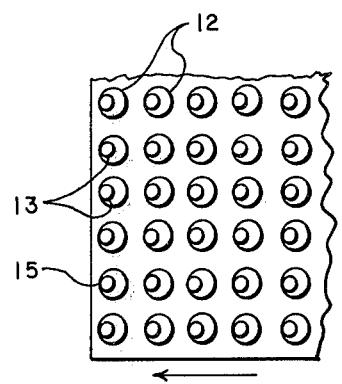
FIG. 2 is an enlarged, fragmentary plan view of the material of FIG. 1.

One preferred way of making molded upright elements properly braced to feed in one direction in a vibratory feeder is shown in FIGS. 1 and 2. Material 10 is preferably injection molded to have a base 11 and a multitude of elements integrally formed with base 11 to extend straight up from base 11. The upright elements each include a lower region 12 and an upper region 13 extending to a tip 14 at the top or upper end of each element. Both the lower regions 12 and the upper regions 13 are preferably cylindrical or slightly tapered, and the axes of upper regions 13 are uniformly offset toward the direction of feed as shown by the arrows relative to the axes of lower regions 12. The forward edges or surfaces 15 of upper regions 13 and lower regions 12 are preferably aligned as illustrated and are approximatey perpendicular to base 11. Such an arrangement offsets the load of object 16 toward the feed direction and makes the upper regions 13 of the elements bend in the direction of feed as illustrated in FIG. 1 when stressed by the vibrational engagement with the mass of an object 16 being fed along tips or upper ends 14.

A preferred way of making material 10 is by drilling a uniform array of holes extending into a steel plate from one face of the plate, and a corresponding array of holes extending into the plate from the other face, so that the holes intersect. When such a plate is mounted in an injection molding machine and resin material is injected into the holes, element portions 12 and 13 and base 11 are formed uniformly and accurately.

As an example of suitable dies for making the material of FIGS. 1 and 2, a 1mm drill can form the holes for lower regions 12, which then have a 1mm diameter, and a 0.5mm drill can form the holes producing upper regions 13, which then have a 0.5mm diameter. The borings are also preferably tapered slightly to facilitate withdrawal of the molded product from the die. The taper at the cutting end of the drill forming the die hole that produces lower region 12 forms a taper 17 at the junction between upper region 13 and lower region 12, and taper 17 is on the side of the elements opposite the direction of feed to help brace upper region 13 against bending away from the direction of feed and to facilitate the bending in the direction of feed as illustrated. The upper region 13 is then arranged between the axis of lower region 12 and the forward edge 15 of each element. The axial offset between upper region 13 and lower region 12 is then 0.25mm toward the direction of feed. The lower region 12 and the upper region 13 are each about 6mm tall for a total height of about 12mm. Of course, many other dimensions can be used, depending on the size and mass of the objects to be fed, with generally thinner and more flexible elements used for lighter objects, and generally thicker and less resilient elements used for heavier objects. Also, the elements can be made more densely arrayed for feeding relatively small objects, and can be spaced further apart for relatively large objects. The flexibility of the plastic material can be adjusted so the elements bend appropriately under different weight objects.

Figure 3:
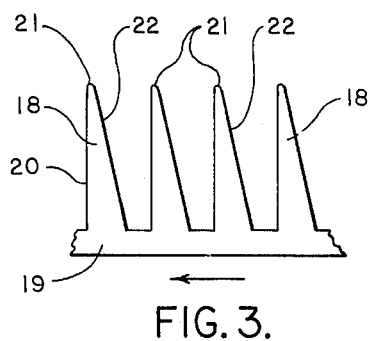
Figure 4:
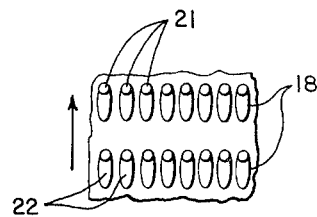

FIGS. 3 and 4 show another preferred way of forming generally upright elements to end only in one direction to provide feeding force in a vibratory feeder. The elements 18 in the molded material of FIG. 3 extend upward from base 19 and have leading edges or surfaces 20 that are upright and approximately perpendicular to the plane of base 19. The upper ends of elements 18 have tips 21 that support objects to be fed, and elements 18 are tapered to have inclined rearward-facing edges 22 extending downward and away from the direction of feed. The tapering edges 22 brace the upper portions of elements 18 against bending away from the direction of feed and make elements 18 bend in the direction of feed as represented by the arrow to advance objects as the feeder vibrates. The tapering rearward edge 22, in effect, forms a buttress bracingeach of the elements 18 against rearward flexure so that forward flexure of elements 18 advances the objects being fed.

The tapered elements 18 of FIGS. 3 and 4 also have the advantage of a draw facilitating release from a mold. The material of FIGS. 3 and 4 can be made economically by grinding tapered grooves across a plate having a thickness of the distance between adjacent rows of leading edges 20 for elements 18, forming a succession of such plates, and clamping the plates together to form a mold part. The load of an object on tips 21 is directed straight downward along leading edge 20 and is offset toward the direction of feed from a line perpendicular to base 19 through the center of the region where elements 18 join base 19 to insure that elements 18 always bend in the direction of feed under the load imposed by an object being fed. Even if elements 18 were not tapered and were formed as cylinders perpendicular to base 19 (which would not be so desirable for molding purposes), bending in the direction of feed can be assured by structuring the tips so that the load from an object being fed is always located along the forward edge of the elements facing in the direction of feed. This can be done, for example, by having element tips formed at a bevel or with a projection so that the engagement of the element tip with an object being fed occurs along the leading or feed direction edge of each element.

Figure 5:
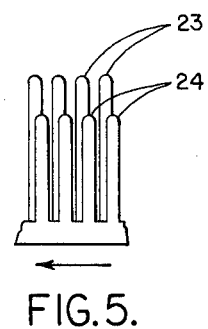
Figure 6:
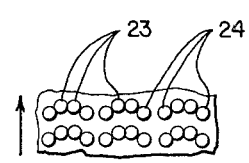

FIGS. 5 and 6 show another way of bracing feed elements 23 with abutments or bracing elements 24 positioned so that feed elements 23 bend only forward in the feed direction as shown by the arrow during vibration. Feed elements 23 and bracing elements 24 are arranged in small arcs with feed elements 23 being positioned in the central region of each arc and convexly facing in the direction of feed. The bracing elements are arranged closely adjacent feed elements 23 at the end regions of each arc to support elements 23 against backward flexure away from the direction of feed.

Figure 7:
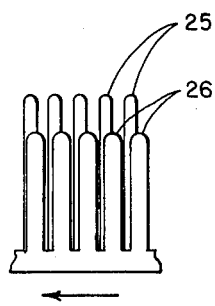
Figure 8:
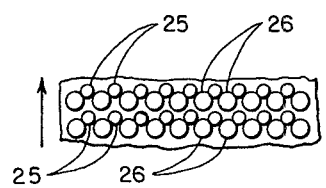

Another preferred embodiment is shown in FIGS. 7 and 8 where feed elements 25 are arranged in rows transverse to the direction of feed as shown by the arrow, and shorter bracing elements 26 are arranged in the spaces between feed elements 25 and immediately behind and adjacent feed elements 25. Brace or abutment projections 26 then support feed elements 25 against rearward flexure so that feed elements 25 bend only in the direction of feed during operation.

Figure 9:
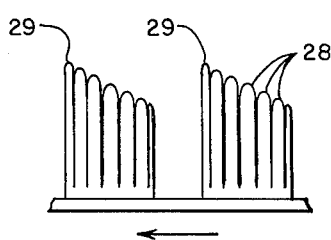
Figure 10:
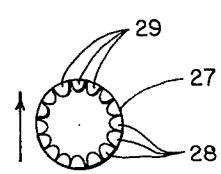

FIGS. 9 and 10 show circular arrays 27 of upright projections 28 arranged closely adjacent each other. Projections 28 are shorter at the rearward edge of each circular array 27 and are tallest along the edge of the circular array 27 facing in the direction of feed as shown by the arrow to form feed elements 29. Adjacent projections 28 brace feed elements 29 against flexure opposite to the direction of feed, and each projection braces its adjacent projection around the forward half of each circular array 27. Lighter objects flex only feed elements 29 at the forward edge of each circular array, and heavier objects flex not only feed elements 29, but adjacent projections 28, which in turn are braced by rearwardly adjacent projections 28 so that all flexure is in the direction of feed for all the projections on the forward half of each circular array 27.

Resilient elements for feeding objects with the inventive molded material can also extend for a considerable distance transversely of the direction of feed to form flexible fins rather than flexible pins or rods. For example, instead of narrow upright elements 18 arranged in transverse rows as shown in FIGS. 3 and 4, wider upright elements each having a forward surface 20 approximately perpendicular to base 19 can extend transversely across the molded material and be braced either intermittently or continuously by tapered rear surface 22 to insure bending only in the forward feed direction. Similarly, feed elements 23 of FIGS. 5 and 6 can be formed into transversely extending fins braced against rearward flexure by projections 24 adjacent the side edges of each fin. Also, feed elements 25 of FIGS. 7 and 8 can be converted to thin, flexible transverse strips periodically braced against rearward flexure by projections 26.

Figure 11:
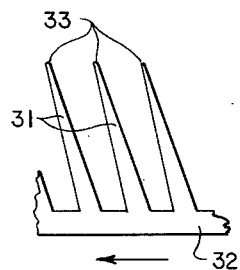
Figure 12:
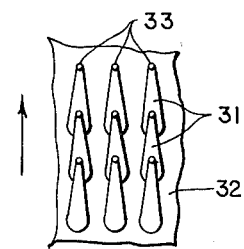

Another way that molded elements can be configured according to the invention to bend reliably in the feed direction and not in the reverse direction is by molding the elements in a tapered shape and inclining them from a perpendicular to the base toward the direction of feed. Such an arrangement is shown in FIGS. 11 and 12 where elements 31 are formed as generally conically tapered pins or thin rods extending upward from base 32 and molded integrally with base 32 to incline from the perpendicular to the base toward the direction of feed as indicated by the arrow. This disposes the tips 33 of elements 31 toward the direction of feed from the bases of the elements to insure that bending under the objects being fed in response to the vibrational drive is always in the direction of feed and not in the reverse direction. The taper of elements 31 facilitates integral molding with the base and also gives the elements a shape that ccooperates with their inclination to insure bending only in the direction of feed.

Figure 13:
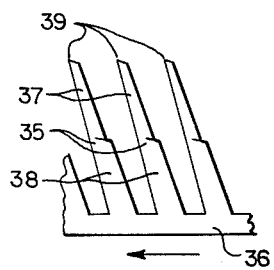
Figure 14:
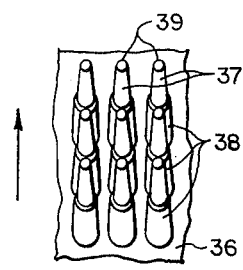

The same principles are applied to inclined elements 35 of FIGS. 13 and 14, which are similar to the elements shown in FIGS. 1 and 2, except for being slightly tapered and inclined from the perpendicular to the base 36 toward the direction of feed as shown by the arrows. Elements 35 have relatively thinner upper regions 37 axially offset toward the direction of feed from relatively thicker lower regions 38, and in addition have beveled or shaped tips 39 that offset the point of engagement with objects as far as possible toward the direction of feed.

Figure 15:
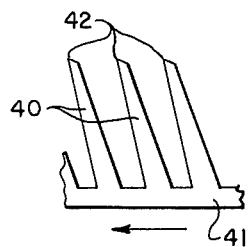
Figure 16:
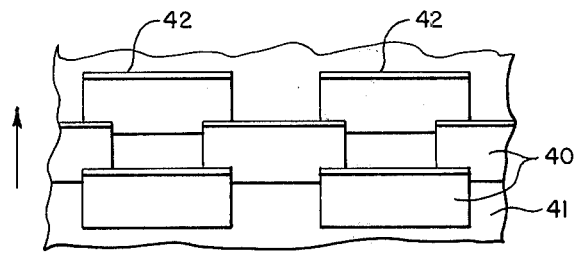

Elements 40 of FIGS. 15 and 16 are also inclined from the perpendicular to the base 41 toward the direction of feed and also have beveled tips 42 locating the object-support point as far toward the direction of feed as possible. Elements 40 differ from elements 31 of FIGS. 11 and 12 in being blade-like or fin-like as best shown in FIG. 16, rather than conically tapered.

Molded flexible feed elements according to the invention can have a variety of cross-sectional shapes besides circular as shown in FIGS. 11 and 12 and rectangular as shown in FIGS. 5 and 16, and these include triangular, T-shaped, and many other possibilities. Also, molded elements can be made from ground or bored openings in dies in a variety of tapers and tip configurations.

The illustrated variations in molded elements are not exhaustive, and resilient elements can have conical shapes, stepped constructions, more than two different diameters, non-circular horizontal cross sections, and many other variations within the general principles of placing the object load along the feed-direction edge of the elements or bracing the elements against rearward flexure to allow substantially only forward flexure during operation. The elements need not be injection molded, and can be formed in generally known continuous molding processes. Either way, a predetermined modular width is preferably selected so that pieces of material are readily installed on the vibrating surface of a feeder with minimum cutting and fitting.

The feeder can be vibrated in several different modes, as is generally known, but preferred vibrational modes include upward and downward movements so that the elements are forced upward under the object being fed, moved back down under the object, and forced back up against the object repeatedly to move the object along speedily and forcefully by the resilient flexure of the elements. Those skilled in the art will appreciate the many materials and molding processes suitable for making upright elements according to the invention, and they will be able to structure and size the elements in a properly braced configuration to feed a variety of objects.

I claim:

1. Molded resilient element material for a vibratory feeder extending in a direction of feed, said material comprising:
    a. molded resilient resin material having a base extending in said direction of feed;
    b. generally upright elements molded integrally with said base to extend upward from said base;
    c. said elements having upper ends cooperating to support objects being fed vibrationally;
    d. said elements being configured so that the weight of said objects places a load on said upper ends in a position spaced toward said direction of feed from respective lines perpendicular to said base through the centers of the regions where said elements join said base; and
    e. said elements being resilient enough to bend in said direction of feed under said load during vibration.

2. The material of claim 1 wherein said elements have lower regions thicker than upper regions.

3. The material of claim 1 wherein said elements have a taper inclined downward and rearward relative to said direction of feed.

4. The material of claim 1 wherein the forward surface of each of said elements facing in said direction of feed is approximately perpendicular to said base.

5. The material of claim 1 wherein lower regions of said elements have relatively larger diameters than upper regions of said elements, and said upper regions have axes offset toward said direction of feed relative to the axes of said lower regions.

6. Molded resilient element material for a vibratory feeder extending in a direction of feed, said material comprising:

a. molded resilient resin material having a base extending in said direction of feed;
b. generally upright elements molded integrally with said base to extend upward from said base;
c. said elements having upper ends cooperating to support objects being fed vibrationally;
d. said elements being configured to brace against bending in a direction opposite to said direction of feed; and
e. said elements being resilient enough to bend in said direction of feed under the weight of said objects during vibration.

7. The material of claim 6 wherein said elements have lower regions thicker than upper regions.

8. The material of claim 6 wherein said elements have a taper inclined downward and rearward relative to said direction of feed.

9. The material of claim 6 wherein the forward surface of each of said elements facing in said direction of feed is approximately perpendicular to said base.

10. The material of claim 6 wherein lower regions of said elements have relatively larger diameters than upper regions of said elements, and said upper regions have axes offset toward said direction of feed relative to the axes of said lower regions.

11. Molded resilient element material for a vibratory feeder extending in a direction of feed, said material comprising:
a. molded resilient resin material having a base extending in said direction of feed;
b. generally upright elements molded integrally with said base to extend upward from said base;
c. said elements having upper ends cooperating to support objects being fed vibrationally;
d. a portion of said molded resin material being formed relative to said elements for bracing said elements against bending in a direction opposite to said feed direction; and
e. said elements being resilient enough to bend in said direction of feed under the weight of said objects during vibrations.

12. The material of claim 11 wherein said bracing portion of said resin material comprises buttresses for said elements.

13. The material of claim 11 wherein said bracing portion of said resin material comprises upright projections shorter than said elements and closely adjacent said elements on the side of said elements opposite said direction of feed.

14. The material of claim 11 wherein said bracing portion of said resin material comprises abutments closely adjacent said elements on the side of said elements opposite said direction of feed.

15. The material of claim 11 wherein said elements are arranged in central regions of arcs oriented convexly toward said direction of feed, and said bracing portion of said resin material comprises support projections shorter than said elements and arranged in end regions of said arcs.

16. The material of claim 11 wherein said elements are spaced apart in rows generally transverse to said direction of feed and said bracing portion of said resin material comprises support projections arranged in spaces between said elements closely adjacent said elements and rearward of said elements relative to said direction of feed.

17. The material of claim 11 wherein said elements are arranged in circular groups of closely adjacent projections extending upward from said base, said elements being in the region of said circular groups facing in said direction of feed, and the rest of said projections in said circular groups being shorter than said elements.

18. Molded resilient element material for a vibratory feeder extending in a direction of feed, said material comprising:
a. molded resilient resin material having a base extending in said direction of feed;
b. generally upright elements molded integrally with said base to extend upward from said base;
c. said elements having upper ends cooperating to support objects being fed vibrationally;
d. said elements being tapered to have smaller cross-sectional areas with increasing distance upward from said base;
e. said elements being inclined from a perpendicular to said base toward said direction of feed; and
f. said elements being resilient enough to bend in said direction of feed under said load during vibration.

19. The material of claim 18 wherein lower regions of said elements have relatively larger diameters than upper regions of said elements, and said upper regions have axes offset toward said direction of feed relative to the axes of said lower regions.

20. The material of claim 18 wherein said upper ends of said elements have object-supporting tips offset from the axes of said elements toward said direction of feed.

* * * * *